United States Patent
Daruwalla et al.

[11] Patent Number: 6,128,296
[45] Date of Patent: Oct. 3, 2000

[54] METHOD AND APPARATUS FOR DISTRIBUTED PACKET SWITCHING USING DISTRIBUTED ADDRESS TABLES

[75] Inventors: Feisal Daruwalla, Santa Clara; Hon Wah Chin, Palo Alto, both of Calif.

[73] Assignee: Cisco Technology, Inc., San Jose, Calif.

[21] Appl. No.: 08/943,761

[22] Filed: Oct. 3, 1997

[51] Int. Cl.$^7$ ................................................ H04L 12/28
[52] U.S. Cl. ........................................ 370/389; 370/395
[58] Field of Search ................................. 370/389, 396, 370/400, 402, 408, 428, 413, 395, 320; 340/825.02

[56] References Cited

U.S. PATENT DOCUMENTS

| | | | |
|---|---|---|---|
| 4,996,524 | 2/1991 | Tojima | 340/825.02 |
| 5,060,228 | 10/1991 | Tsutsui et al. | 370/402 |
| 5,274,631 | 12/1993 | Bhardwaj | 370/60 |
| 5,455,820 | 10/1995 | Yamada | 370/413 |
| 5,473,607 | 12/1995 | Hausman et al. | 370/85.13 |
| 5,509,006 | 4/1996 | Wilford et al. | 370/60 |
| 5,515,376 | 5/1996 | Murthy et al. | 370/85.13 |
| 5,561,669 | 10/1996 | Lenney et al. | 370/60.1 |
| 5,598,581 | 1/1997 | Daines et al. | 395/872 |
| 5,617,412 | 4/1997 | Delprat et al. | 370/281 |
| 5,632,021 | 5/1997 | Jennings et al. | 395/309 |
| 5,781,549 | 7/1998 | Dai | 370/398 |
| 5,838,677 | 11/1998 | Kozaki et al. | 370/389 |
| 5,978,364 | 11/1999 | Melnik | 370/320 |

*Primary Examiner*—Huy D. Vu
*Assistant Examiner*—Alexander Boakye
*Attorney, Agent, or Firm*—Blakely, Sokoloff, Taylor & Zafman LLP

[57] ABSTRACT

A method and apparatus for packet switching using distributed address tables. A first table of station addresses and their associated switching device ports is maintained on a central node of a switching device. Entries in the first table are based on learning information associated with packets forwarded by the central node. A second table of station addresses and their associated switching device ports is maintained on a local node of the switching device. Entries in the second table are based on learning information associated with packets forwarded by the local node. The packets forwarded by the local node include packets not forwarded by the central node so that the first and second tables of station addresses are different from one another.

15 Claims, 6 Drawing Sheets

| PACKET TRANSACTION NO. | TRANSMISSION INDICATED BY PACKET | RESULT | LSN ADDRESS TABLE | | CSN ADDRESS TABLE | |
|---|---|---|---|---|---|---|
| 1 | A → F  (RCV'D ON PORT 0) | FLOOD LSN  FLOOD CSN | PORT | STATION | PORT | STATION |
| | | | 0 | A | 0 | A |
| 2 | B → A  (RCV'D ON PORT 1) | SWITCH PACKET LOCALLY FROM PORT 1 TO PORT 0 | PORT | STATION | PORT | STATION |
| | | | 0 | A | 0 | A |
| | | | 1 | B | | |
| 3 | E → C  (RCV'D ON PORT 15) | FLOOD CSN  FLOOD LSN | PORT | STATION | PORT | STATION |
| | | | 0 | A | 0 | A |
| | | | 1 | B | 15 | E |
| | | | CSN | E | | |
| 4 | C → E  (RCV'D ON PORT 2) | SWITCH PACKET FROM PORT 2 TO UPLINK IN LSN, SWITCH PACKET FROM UPLINK TO PORT 15 IN CSN | PORT | STATION | PORT | STATION |
| | | | 0 | A | 0 | A |
| | | | 1 | B | 15 | E |
| | | | CSN | E | 2 | C |
| | | | 2 | C | | |
| 5 | E → B  (RCV'D ON PORT 15) | FLOOD CSN  FLOOD LSN | NO CHANGE | | NO CHANGE | |
| 6 | E → A | SWITCH PACKET TO LOCAL NODE VIA UPLINK, SWITCH PACKET TO PORT 0 | NO CHANGE | | NO CHANGE | |

METHOD AND APPARATUS FOR DISTRIBUTED PACKET SWITCHING USING DISTRIBUTED ADDRESS TABLES

FIELD OF THE INVENTION

The present invention relates to the field of network communications, and more particularly to a method and apparatus for forwarding packets between ports on a switching device.

BACKGROUND OF THE INVENTION

Data is transferred between stations on a computer network by specialized switching devices such as routers, bridges and switch nodes. Switching devices typically include a number of ports for physically connecting to network stations (e.g., workstations, printers and other switching devices), and a switching fabric for providing connection paths between the ports.

Routers, bridges, switch nodes and other switching devices (referred to collectively herein as "switching devices") typically use tables called "address tables" to control the forwarding of data packets received on their ports. Each entry in an address table associates a port on the switching device with the address of a network station. When a packet is received, its destination address is compared with entries in the table and, if a matching entry is found, the packet is forwarded to the port indicated by the table entry. If no matching station address is found in the table, the packet is typically transmitted out all ports of the switching device in a flooding operation.

Some types of switching devices generate and maintain station address tables based on source address information that is present in packets they receive. For example, if a packet received on port 0 of a switching device indicates that it was generated by a station having address A, the switching device has "learned" that station A is coupled directly or indirectly to port 0 and will record this information in its address table. If a packet destined for station A is subsequently received, the switching device can forward the packet to port 0 without having to flood all ports.

The station address table is dynamic in that new entries are added as new station addresses are detected, and existing entries must be updated when inconsistencies are determined. For example, if a port assignment of a station is changed, the switching device must respond by updating the entry in the address table to reflect the changed port assignment. Also, because the size of the address table is finite, and the number of station addresses on the network may be very large, it is usually necessary to overwrite infrequently used entries of the address table with more recent entries. Further, it is occasionally necessary to update entries in an address table due to a change in port assignment of a station. The process of updating or invalidating an old station address entry in an address table is referred to as "aging-out" the station address.

Some switching devices are organized into multiple nodes, with each node having a designated portion of the device ports. While this distributed design offers the advantage of faster, localized switching, it also complicates maintenance of the address table because the learning information needed to generate table entries may remain within the various local nodes.

In order to maintain a coherent address table in a multiple-node switching device, two techniques have been used. In one approach, multiple address tables are replicated in each of the local nodes. Replicated localized tables offer relatively fast access so that fast local switching times are maintained, but a replication protocol must be established to ensure that each of the local nodes are working from the same address table. Also, there is a loss of efficiency because multiple replicated address tables must be maintained instead of just one address table.

In an alternative approach, a centralized address table is maintained for use by all of the nodes of the switching device. When a centralized table is used, the loss of efficiency associated with maintaining multiple tables is avoided, but the local nodes must communicate with the centralized table in order to look up destination port assignments, even if the input port and the output port are located on the same local node. In other words, some of the advantage of localized switching is lost since a centrally maintained address table must be accessed to determine the destination port corresponding to a station address.

SUMMARY OF THE INVENTION

A method and apparatus are disclosed for packet switching using distributed address tables. A first table of station addresses and their associated ports on a switching device is maintained on a central node of the switching device. The first table of station addresses contains entries based on learning information associated with packets forwarded by the central node. A second table of station addresses and their associated ports is maintained on a local node of the switching device. The second table of station addresses contains entries based on learning information associated with packets forwarded by the local node.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which:

FIG. 3 is a table illustrating the effect of a series of packet forwarding transactions on respective address tables maintained by central and local nodes of a switching device.

DETAILED DESCRIPTION

For embodiments of the present invention, distributed, non-replicated address tables are used to control packet forwarding. A switching device according to one embodiment of the present invention includes a central node having a central node address table, and one or more local nodes, each having a respective local node address table. By allowing the central and local nodes to generate and maintain separate, divergent address tables based on packets forwarded by those respective nodes, smaller, more manageable address tables are possible than with prior art replicated and centralized techniques. Because the address tables contain only the addresses that are needed by their respective nodes, table searches are faster and switching times are reduced. Also, because localized switching is possible (i.e., packet switching without having to forward packets to a centralized location), the benefit of faster localized switching is achieved without the burden of having to replicate address tables on each of the nodes of the switching device. To prevent conflicting entries from accruing in the distributed address tables, an invalidation protocol is used to communicate potentially invalidating events between the central and local nodes of the switching device.

Figure 1:
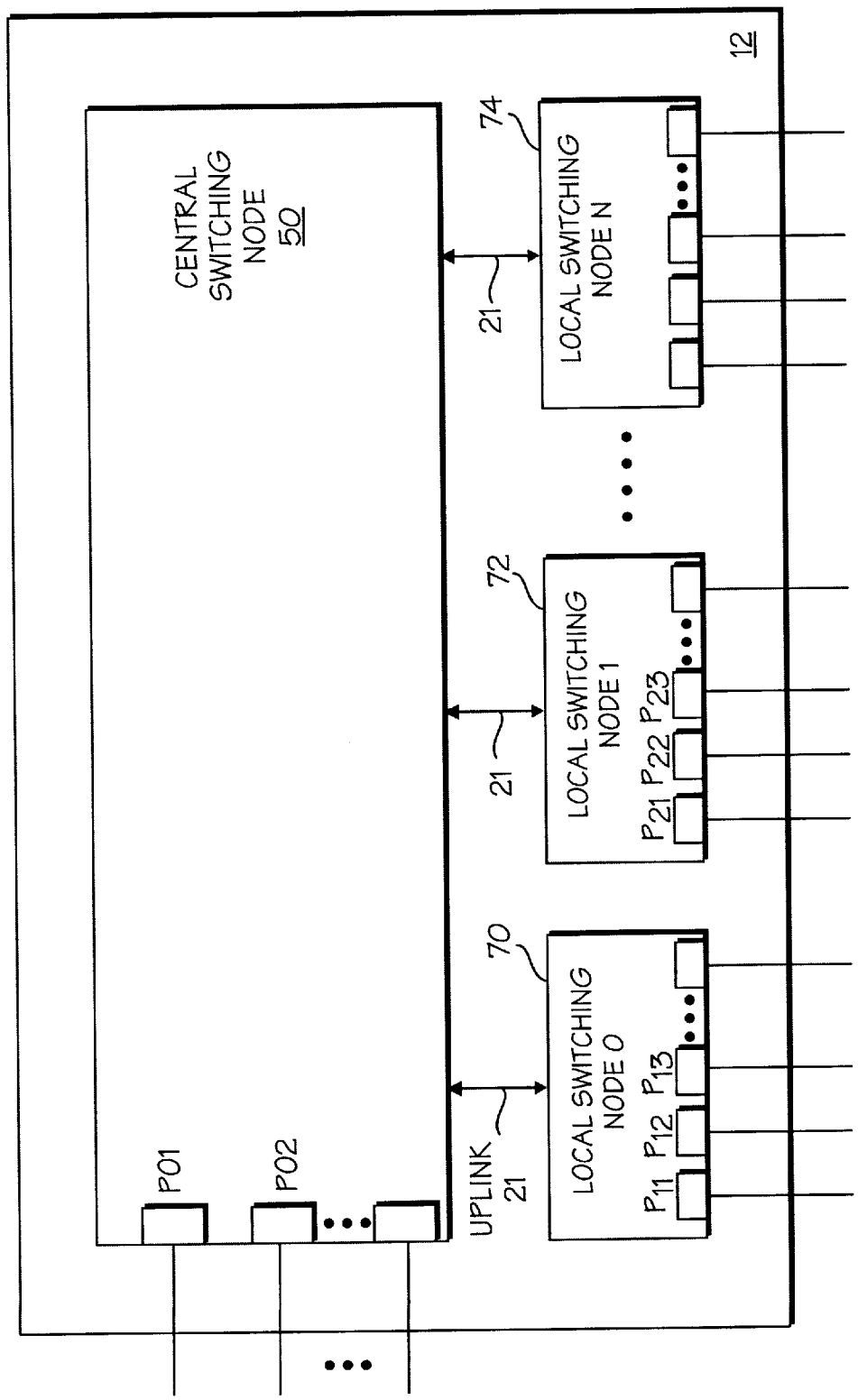
FIG. 1 is a block diagram of a switching device according to one embodiment of the present invention.

FIG. 1 is a block diagram of a switching device 12 according to one embodiment of the present invention. The switching device 12 includes a central switching node 50 having a number of ports (P01, P02, . . . ) attached thereto, and N local switching nodes (70, 72, 74) each having a number of ports attached thereto. As indicated each of the local switching nodes (70, 72, 74) is coupled to the central switching node 50 via a communication path referred to herein as an "uplink" 21. In an alternate embodiment of the present invention, the local nodes (70, 72, 74) share a single uplink 21 connection to the central node 50. In this scheme, information sent to the central node 50 from a local node includes information identifying the local node from which it was sent. This is accomplished in one embodiment of the present invention by assigning different port numbers to the ports of each local node so that the port number accompanying information sent to the central node via the uplink can be used by the central node to determine which local node is the source of the information. Other techniques for identifying the sourcing local node may be used. By multiplexing the uplink 21 in the above-described manner, a virtual local area network (VLAN) can be implemented.

Each of the local switching nodes (70, 72, 74) and the central switching node 50 maintain respective address tables. Unlike prior art approaches, however, the address tables are not replicas of one another and are allowed to diverge based on localized learning.

For one embodiment, the central switching node 50 is responsible for executing a protocol referred to as a "spanning tree protocol" (STP) on behalf of all nodes in the switching device 12. This protocol is defined in the Institute of Electrical and Electronic Engineers ("IEEE") standard 802.1d (hereinafter the "IEEE 802. id standard") and is used to establish a tree-like network architecture despite the presence of physical connections that could result in endless transmission loops. The central switching node 50 is also responsible for controlling the age-out time for entries in the address tables of each of the nodes of the switching device 12. Because of the need to execute the spanning tree protocol, the central switching node is, according to one embodiment, implemented by a programmed processor. This, however, is not necessary and the central and local switching nodes of the present invention may be implemented by hard-wired circuitry, one or more programmed processors, or any combination of hard-wired circuitry and programmed processors.

Figure 2:
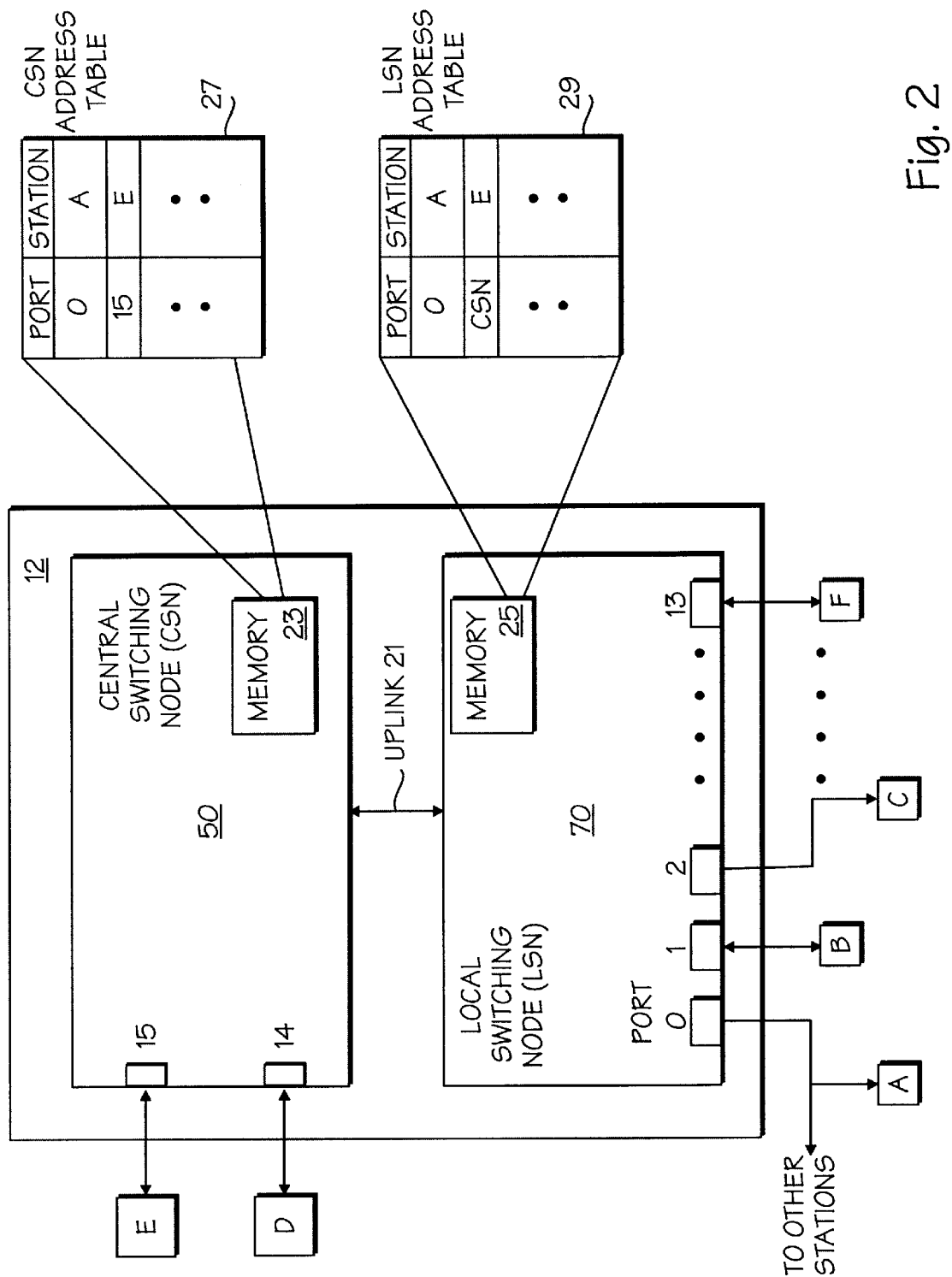
FIG. 2 is a diagram of the switching device of FIG. 1 coupled to a plurality of network stations.

FIG. 2 depicts the switching device 12 of FIG. 1 after it has been coupled to an exemplary network. Though only one local switching node 70 is shown, the concepts described in reference to the single local switching node 70 may be readily extended to any number of local switching nodes. Network stations A, B, C, D, E and F are coupled to ports 0, 1, 2, 14, 15 and 13, respectively, of the local and central switching nodes. The actual network segments used to connect the network stations to the switching device ports may be Ethernet, Fiber-Distributed Data Interface (FDDI), Token Ring, X.25, or any other networks now known or hereafter developed. The network stations A, B, C, D, E and F may be desktop or laptop computers, printers, other switching devices or any other devices that send or receive network data. Also, it should be noted that although only one station is shown connected to each of ports of the switching device each of the ports of the switching device may be coupled to multiple stations. This is indicated in FIG. 2, for example, by the port 0 connection to "other stations".

As indicated in FIG. 2, both the central switching node 50 and the local switching node 70 include memory elements (23 and 25) in which respective address tables 27 and 29 are maintained. These address tables are referred to as the central switching node (CSN) address table 27 and the local switching node (LSN) address table 29 and are used to record the ports of nodes on the switching device to which network stations are known to be coupled.

FIG. 3 is a table 31 illustrating the effect of a series of packet forwarding transactions on the address tables of the central and local nodes of FIG. 2. When the switching device 12 of FIG. 2 is powered on, the address table of the local and central nodes are reset to an empty condition. As indicated in FIG. 3, a first packet is received on port 0 of the switching device (i.e., on the local switching node) and includes a source address A and a destination address F. Because there is no entry in the LSN address table indicating the port at which station F is attached, packets are transmitted out each port of the local switching node (except the port on which the packet was received) and the packet is transferred to the central node via the uplink (e.g., element 21 of FIG. 2). The act of sending a packet out all ports of a node (except the port on which the packet is received) is referred to as "flooding" the node. When the central switching node receives the packet via the uplink, it checks the CSN table to determine if the destination address is listed. Because the CSN table is initially empty, no matching address is found and the packet is output at each port of the central switching node in a central switching node flooding operation. The local and central switching node flooding operations are indicated in the result column of table 31.

According to one embodiment, the central and local switching node address tables are not replicas of one another, and are instead developed based on packets forwarded in the respective central and local switching nodes. That is, the local switching node address table is made up of entries resulting from packet forwarding in the local switching node, and the central switching node address table is made up of entries resulting from packet forwarding in the central node. Because the packet indicating source A and destination F was forwarded by the local switching node (i.e., in a flooding operation), the local switching node has access to the source address information in the packet and therefore "learns" that station address A is located on port 0. This fact is reflected in the LSN address table entry shown in transaction row 1 of table 31. For one embodiment, whenever the local switching node forwards a packet to the central switching node via the uplink, the local switching node also transmits information indicating the local switching node port via which the packet was received.

Because the central switching node has received both a packet containing a source address and information indicating the local switching node port on which the packet was received, the central switching node is able to record an entry in its address table for the station address and its associated local switching node port. This is indicated in table 31 of FIG. 3 by the state of the CSN address table after the first packet transaction is completed. Although a port number is shown in the CSN address table to indicate the local switching node port, additional information such as which of a plurality of local switching nodes the port is located on may also be stored in the CSN address table.

As shown in table 31, a second packet received in the switching device indicates source address B and destination address A. When the local switching node searches the LSN address table, an entry corresponding to station address A will be found and the packet can thus be forwarded by the local switching node from port 1 (on which it is received) to port 0 (the port associated with station address A). Because the packet has been forwarded by the local switching node, the local switching node is able to learn the port to which station B is coupled and updates its address table accordingly. This is indicated by the LSN address table shown in row two of table 31.

Because the packet from B to A is switched locally and is not forwarded to the central node, the central switching node does not learn the port assignment of station address B. Consequently, the CSN address table is not updated so that the CSN and LSN address tables diverge from one another. As discussed below, divergence of the CSN and LSN tables presents certain challenges to the aging-out process and an invalidating protocol is used to ensure that the CSN and LSN tables do not indicate differing port assignments for the same station address. For the present embodiment, however, the overhead required to implement the invalidating protocol is outweighed by the benefit of avoiding replicated address tables in each of the various switching nodes. More specifically, by limiting the entries in the CSN and LSN table to the entries needed by the respective central and local switching nodes, smaller tables can be used at each node. This not only reduces the amount of system resources (i.e., memory) required to implement the switching device, but also allows faster table searches and therefore faster packet switching in the various nodes.

In the third transaction indicated in table 31, a packet is received on port 15 indicating source address E and destination address C. Because the CSN table has no entry for address C, the central switching node floods its ports and also transfers the packet to the local switching node via the uplink. As discussed below, when the central switching node forwards a packet to the local switching node, it does so with an accompanying instruction indicating which of the ports of the local switching node the packet is to be output. For one embodiment, this information is used to control the output of the packet at the local switching node even if the local switching node contains an entry in the LSN address table indicating the destination port of the packet.

In the case of the packet from E to C, the central switching node forwards the packet to the local switching node and also issues a command to the local switching node to flood its ports with the packet (i.e., to output the packet on each port of the local switching node). Because the packet from E to C has been forwarded by the central node, the central switching node learns that station address E corresponds to port 15 and updates the CSN table to reflect this fact. In the local switching node, because the local switching node handles packets received via the uplink according to the accompanying command, the local switching node stores in the LSN table an entry indicating only that the station address has been received via the uplink. This is shown in table 31, row three, by the entry showing that station E is at port CSN. It will be appreciated that in an alternate embodiment, the LSN table entry could be more fully qualified to indicate that station E is located on port 15 of the central switching node.

In the fourth transaction indicated in table 31, a packet is received on port 2 of the local switching node having source address C and destination address E. Because the local switching node has an address table entry indicating that station E is on the central switching node (or at least accessible via the central node), the local switching node forwards the packet to the central switching node via the uplink along with information indicating that the packet was received on local switching node port 2. Also, the local switching node updates the LSN table to indicate that station C is located on port 2.

Upon receiving the C to E packet from the local switching node and the information indicating the local switching node port on which the packet was received, the central switching node determines based on the CSN table that the packet is to be output at port 15. The central switching node outputs the packet accordingly and updates the CSN table to indicate that station C is located on local switching node port 2. This is indicated by the CSN table shown in row 4 of the table 31.

In a fifth transaction, a packet is received on port 15 of the central switching node having source address E and destination address B. Although the LSN table has an entry for station B, the CSN table does not. Consequently, the central switching node floods its ports with the packet and also outputs the packet to the local switching node via the uplink. Because the central switching node does not know the port of the local switching node to which the packet should be destined, the central switching node issues a command to the local switching node to flood its ports. In response, the local switching node transmits the E to B packet on all ports despite having an address table entry indicating that station B is on port 1. Alternatively, the local switching node may ignore the flood command from the central switching node and output the packet to port 1 based on the LSN table entry.

In a sixth transaction, a packet is received on port 15 of the central switching node that has source address E and destination address A. Because the CSN table has an entry indicating that station A is coupled to port 0 of the local switching node, the central switching node forwards the packet to the local switching node via the uplink and includes a command to the local switching node to output the packet on port 0.

Figure 4:
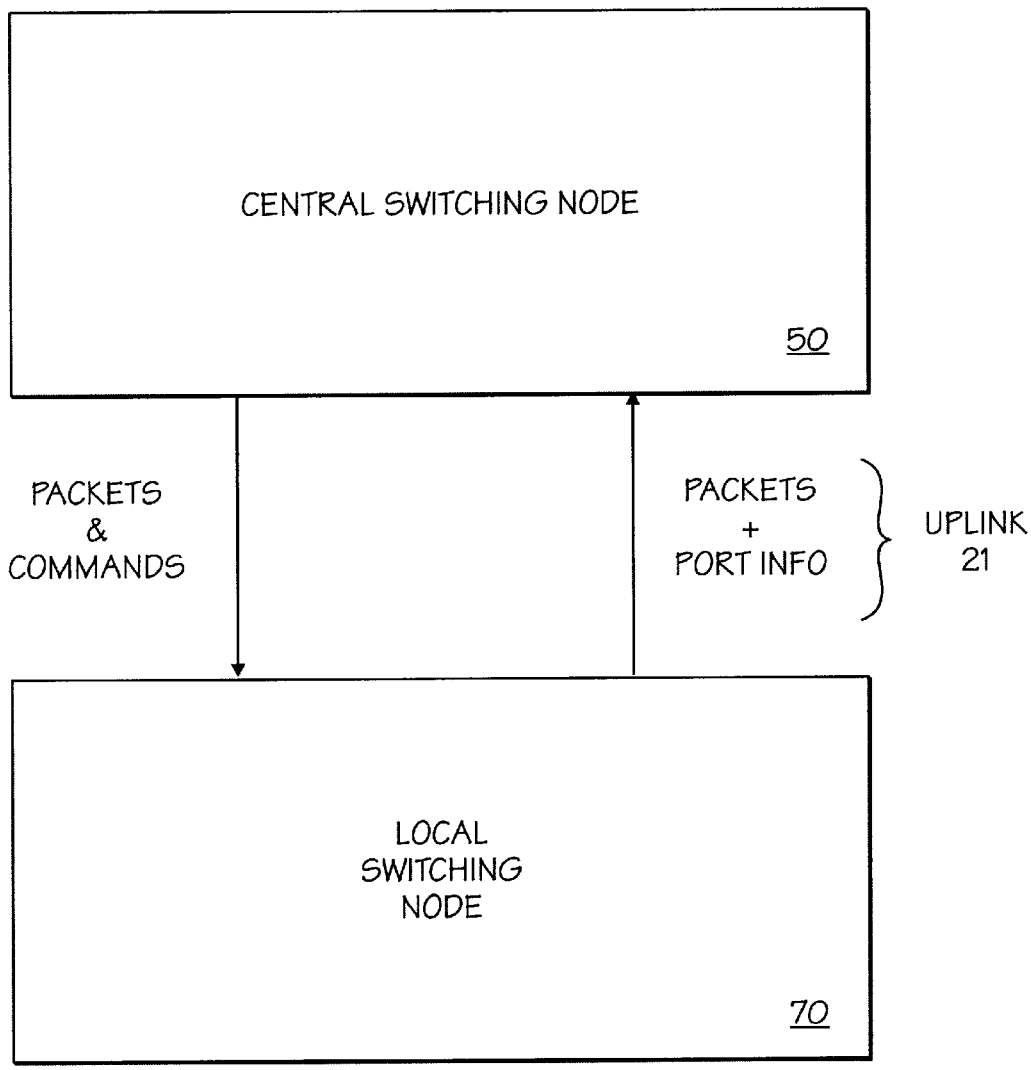
FIG. 4 illustrates information transferred between central and local nodes of a switching device via an uplink.

FIG. 4 is a diagram illustrating the nature of information communicated between the local and central switching nodes via the uplink 21. As indicated, the local switching node 70 forwards packets and port information to the central switching node 50, and the central switching node 50 forwards packets and commands to the local switching node 70. Each packet forwarded to the central switching node 50 from the local switching node 70 is accompanied by a value indicating the port on the local switching node at which the packet was received. As discussed above, the central switching node 50 records the port information in the CSN address table so that the CSN address table has the source port of each packet received in the central switching node, whether received via a central switching node port or via the uplink 21. The commands from the central switching node 50 to the local switching node 70 include, among others, commands to flood the ports of the local switching node 70, commands to output a packet at a specified port of the local switching node 70 and commands to invalidate entries in the LSN address table.

Figure 5:
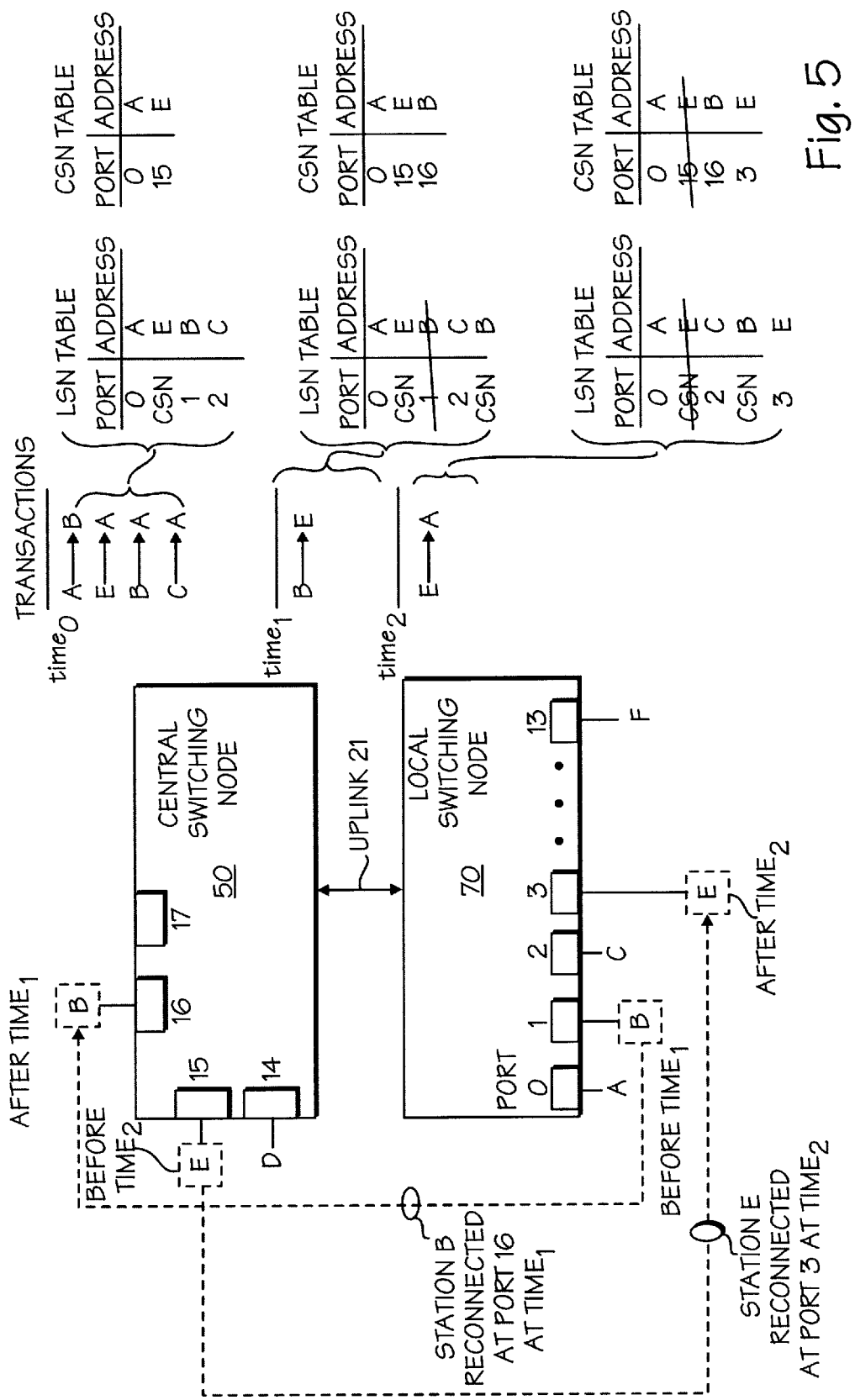
FIG. 5 is a diagram illustrating a sequence of events that require invalidation of address table entries.

FIG. 5 is a diagram illustrating a sequence of events that require invalidation of address table entries in the LSN and CSN address tables. In general, address table entries must be invalidated whenever learning information (i.e., information associating a station address with a port on the switching device) is received that is inconsistent with previously received learning information. One way this can happen is for port assignments to change.

For example, assume that at power-up (i.e., time 0), a central switching node 50 has stations D and E coupled to its ports 14 and 15, respectively, and a local switching node 70 has stations A, B and C coupled to its ports 0, 1 and 2, respectively. If the sequence of transactions shown in FIG. 5 then takes place prior to time 1 (i.e., packet from A to B received on port 0, packet from E to A received on port 15, packet from B to A received on port 1, and packet from C to A received on port 2), then the LSN and CSN address tables will have the respective states shown in FIG. 5. Notice that the CSN address table contains no entry for station B because the packet from station B was not been forwarded to the central node, but rather was switched exclusively on the local switching node 70 to port 0.

If, at time 1, station B is reconnected in the at port 16 of the central switching node 50, then when the packet from B to E is subsequently received at port 16 of the central switching node 50, the potential for conflict between the CSN and LSN address tables arises. The central switching node could simply switch the packet to port 15, because the CSN table indicates that station E is located on port 15. There is, however, a possibility that the local switching node has previously recorded a different port assignment for station B, which it has in this case. Also, because previous packets received from station B have been switched only to other local ports (e.g., B to A), the central switching node is unaware of the conflicting port assignment for station B. Consequently, if the central switching node updates the CSN address table to indicate that station B is located on port 16 without somehow notifying the local switching node of this fact, the address tables for the local and remote nodes will have conflicting port assignments for station B. Worse, unless station B transmits a packet addressed to a station on a local switching node port, the conflicting port assignments for station B may remain indefinitely. Packets from stations on other local switching node ports that are addressed to station B will incorrectly be switched to local switching node port 1 until the conflicting port assignments in the local and central switching node tables are discovered.

For one embodiment, the above-described conflict between the local and central switching node address tables is avoided by having the central switching node issue an invalidating command to the local switching node for every new station found to be coupled to a central switching node port. In response to the invalidating command, the local switching node searches the local switching node address table for the indicated station address and, if found, invalidates the entry in the local switching node address table. Referring to FIG. 5, for example, after receiving a packet from station B on port 16, the central switching node issues an invalidating command to the local switching node via the uplink 21. In response to the invalidating command, the local switching node searches the LSN table for a station B address entry. When the entry indicating that station B is located on port 1 is found, the entry is invalidated. Invalidation may involve removing the entry from the table or replacing the entry with a new entry indicating the correct port assignment of the station address. Because an invalidating command for station B has been received from the central switching node 50, the local switching node 70 may assume that station B is accessible via the central switching node and so indicates by recording an entry in the LSN table (i.e., CSN, B) as shown in FIG. 5.

In some circumstances, it may also be necessary to invalidate entries in the CSN address table. Referring to FIG. 5, for example, if station E is disconnected from port 15 of the central switching node 50 and reconnected at port 3 of the local switching node 70 at time 2, then it may become necessary to invalidate the entry in the CSN table indicating that station E is connected to port 15 of the central switching node 50. If the CSN table entry is not invalidated, then packets destined for station E that are received on other ports of the central switching node 50 may be erroneously forwarded to port 15. Fortunately, by virtue of having the central switching node 50 notify the local switching node 70 of each station address associated with a port of the central switching node 50, the local switching node 70 will know of all stations that are connected to the central switching node 50 (this is indicated in FIG. 5 by the CSN, E entry in the LSN table). Consequently, when a packet is received on port 3 of the local switching node 70 from station E, the local switching node 70 can scan the LSN address table to determine if there are existing entries for station E that conflict with the new learning information. In this case, a conflicting entry in the LSN address table indicates that station E is coupled to the central switching node 50. In response to detecting this conflicting address table entry, the local switching node 70 invalidates the address table entry that indicates that station E is located on the central switching node 50 and sends information to the central switching node 50 indicating the number of the port (i.e., port 3) on which the packet was received and the source address listed in the packet. Upon receiving the information indicating that station E is coupled to port 3 of the local switching node 70, the central switching node 50 invalidates the conflicting CSN address table entry (15, E).

To summarize the invalidating protocol implemented in one embodiment of the present invention, a central switching node issues an invalidating command identifying the address of each new station determined to be coupled to a central switching node port, and the local switching nodes likewise send information to the central node identifying the address of each new station determined to be coupled to a local node port.

Figure 6:
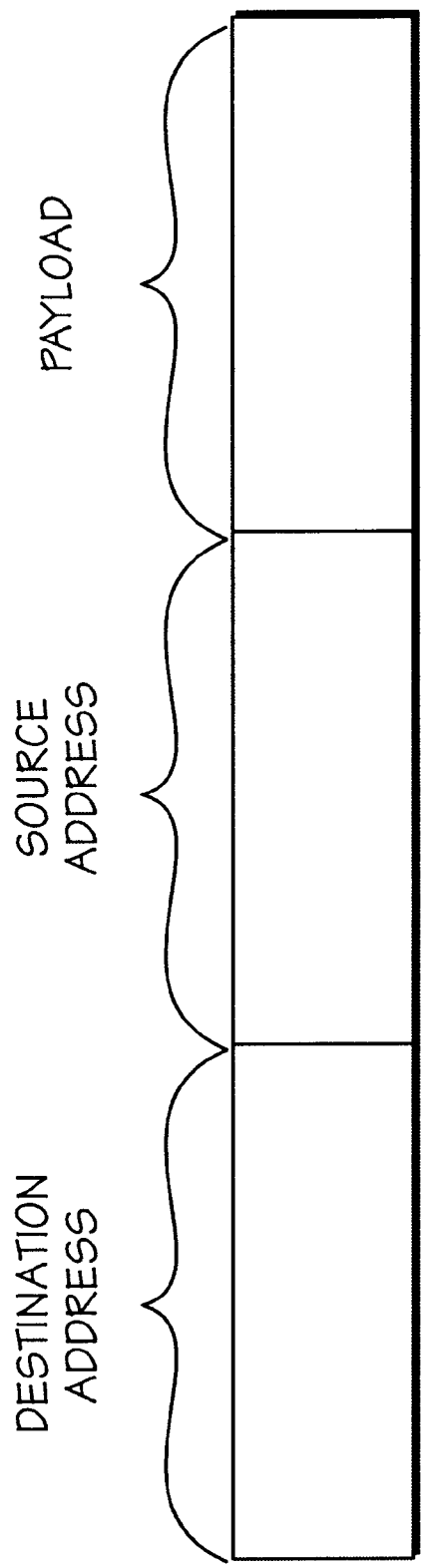
FIG. 6 is a packet diagram.

FIG. 6 illustrates the format of a packet that can be switched in the switching device of the present invention. Packets are generated in a sending device by appending a payload (i.e., message data) to header information that includes source address and destination address information. Generally, packet headers are formatted according to a protocol stack in which source and destination information is available in each of a number of different protocol layers. Layer one of the protocol stack is usually reserved for physical device information, layer two is used to provide media access control (MAC) information, layer three of the protocol stack provides yet higher level information (e.g., network protocol information), and so forth. In the present implementation, source and destination information from any layer of the protocol stack may be used to generate and maintain the above-described local and central address tables.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly to be regarded in an illustrative rather than a restrictive sense.

What is claimed is:

1. A method comprising the steps of:

maintaining a first table of station addresses and corresponding ports on a central node of a switching device, the first table of station addresses containing entries based learning information associated with packets received by the central node; and maintaining a second table of station addresses and corresponding ports on a local node of the switching device, the second table of station addresses containing entries based on learning information associated with packets forwarded by the local node.

2. The method of claim 1 wherein the second table of station addresses contains different entries than the first table of station addresses.

3. The method of claim 1 further comprising the steps of:

determining in the central node that a station having a first address is coupled to a port of the central node;

issuing an invalidation command from the central node to the local node, the command indicating the first address; and invalidating an entry in the second address table indicating that a station having the address indicated by the invalidation command is coupled to a port of the local node.

4. An switching device comprising:

means for maintaining a first table of station addresses and corresponding ports on a central node of the switching device, the first table of station addresses containing entries based learning information associated with packets forwarded by the central node; and means for maintaining a second table of station addresses and corresponding ports on a local node of the switching device, the second table of station addresses containing entries based on learning information associated with packets forwarded by the local node.

5. The switching device of claim 4 further comprising:

means for determining in the central node that a station having a first address is coupled to a port of the central node;

means for issuing an invalidation command from the central node to the local node, the command indicating the first address; and means for invalidating an entry in the second address table indicating that a station having the address indicated by the invalidation command is coupled to a port of the local node.

6. A switching device comprising:

first packet processing logic configured to maintain a first table of station addresses and their associated ports on a central node of the switching device, the first table of station addresses containing entries based learning information associated with packets forwarded by the central node; and second packet processing logic configured to maintain a second table of station addresses and their associated ports on a local node of the switching device, the second table of station addresses containing entries based on learning information associated with packets forwarded by the local node, wherein at least one of the first packet processing logic and the second packet processing logic is implemented by a programmed processor.

7. The switching device of claim 6 wherein the first packet processing logic is further configured to determine that a station having a first address is coupled to a port of the central node and issue a command to the local node to invalidate an entry in the local node table that indicates that the station having the first address is coupled to a port of the local node.

8. A packet forwarding engine comprising:

a central node that maintains a first table of station addresses and their associated ports on the forwarding engine based on source address information in packets forwarded by the central node; and a local node that maintains a second table of station addresses and their associated ports on the local node based on source address information in packets forwarded by the local node, the local node being configured to forward packets received on ports of the local node that are destined for other ports of the local node without forwarding the packets to the central node so that the second table of station addresses is different from the first table of station addresses.

9. The packet forwarding engine of claim 8 wherein the central node is coupled to the local node via an uplink and wherein the local node forwards packets and port information to the central node via the uplink and the central node forwards packets and commands to the local node.

10. The packet forwarding engine of claim 9 wherein the central node is configured to issue a command to the local node in response to detecting that a first st ation is coupled to a port of the central node, the command to the local node causing the local node to search the second table of station addresses and invalidate an entry, if present, that indicates that the first station is coupled to a port on the local node.

11. The packet forwarding engine of claim 8 wherein the local node is configured to compare a source address in a first packet received on a port of the local node against entries in the second table to determine if there is an entry in the second table indicating that a station corresponding to the source address is coupled to a port of the switching device not on the local node.

12. The packet forwarding engine of claim 11 wherein the local node is further configured to forward the first packet to the central node together with information indicating the port of the local node at which the packet was received.

13. The packet forwarding engine of claim 8 wherein the central node executes a spanning tree protocol on behalf of itself and the local node.

14. A network comprising:

a plurality of network stations each having a respective network address;

a switching device including:

a central node that maintains a first table of network addresses based on source address information in packets forwarded by the central node, each entry of the first table indicating a network address of one of the plurality of network stations and a port on the switching device at which a packet has been received from the one of the plurality of network stations; and a local node that maintains a second table of network addresses based on source address information in packets forwarded by the local node, the local node being configured to forward packets received on ports of the local node that are destined for other ports of the local node without forwarding the packets to the central node so that the second table of station addresses is different from the first table of station addresses, each entry of the second table indicating a network address of one of the plurality of network stations and a port on the switching device at which a packet has been received from the one of the plurality of network stations.

15. The network of claim 14 wherein the central node of the switching device is configured to issue a command to the local node in response to detecting that a first station of the plurality of network stations is coupled to a port of the central node, the command to the local node causing the local node to search the second table of network addresses and invalidate an entry, if present, that indicates that the first station is coupled to a port on the local node.

* * * * *